Figure 1:
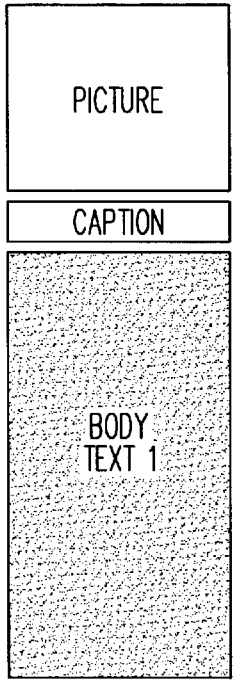

United States Patent [19]

Langford-Wilson

[11] Patent Number: 5,953,733

[45] Date of Patent: Sep. 14, 1999

[54] ELECTRONIC PUBLISHING SYSTEM

[75] Inventor: Alistair Langford-Wilson, Abbotsford, Australia

[73] Assignee: Cybergraphic Systems Ltd., Hawthorn, Australia

[21] Appl. No.: 08/667,699

[22] Filed: Jun. 21, 1996

[30] Foreign Application Priority Data

Jun. 22, 1995 [AU] Australia .............................. PN 3742

[51] Int. Cl.⁶ ...................................................... G06F 17/21
[52] U.S. Cl. ............................................................ 707/517
[58] Field of Search ................................... 707/505–509, 707/517, 520–521, 523

[56] References Cited

U.S. PATENT DOCUMENTS

| | | |
|---|---|---|
| 4,755,955 | 7/1988 | Kimura . |
| 4,829,470 | 5/1989 | Wang . |
| 5,079,724 | 1/1992 | Shiraki . |
| 5,113,488 | 5/1992 | Bischel . |
| 5,181,162 | 1/1993 | Smith et al. ............................ 707/530 |
| 5,241,624 | 8/1993 | Torres ..................................... 345/429 |
| 5,287,443 | 2/1994 | Mameda . |
| 5,323,312 | 6/1994 | Saito et al. .............................. 707/517 |
| 5,390,354 | 2/1995 | de Heus . |
| 5,434,961 | 7/1995 | Horiuchi et al. ........................ 707/517 |
| 5,475,805 | 12/1995 | Murata ................................... 707/513 |
| 5,517,621 | 5/1996 | Fukui et al. ............................ 707/517 |
| 5,555,362 | 9/1996 | Yamashita et al. ..................... 707/517 |
| 5,678,039 | 10/1997 | Hinks et al. ................................ 707/4 |
| 5,742,837 | 4/1998 | Fukui et al. ............................ 707/517 |

FOREIGN PATENT DOCUMENTS 2 246 102   1/1992   United Kingdom .

*Primary Examiner*—Anton Fetting
*Attorney, Agent, or Firm*—Burns, Doane, Swecker & Mathis, L.L.P.

[57] ABSTRACT

The present invention has application in electronic and printed media such as newspapers, magazines and computer text systems. The present invention relates to a mechanism by which text and images for publishing can be prepared and/or edited. The invention has particular application in the layout of newsholes.

The present application discloses an electronic media publishing system comprising a data base in which there is stored, inter alia, a layout style, a layout family, layout children and layout cousins. There is also disclosed a method of preparing a layout of information in which a newshole is selected and resized if necessary in accordance with user definable rules.

16 Claims, 5 Drawing Sheets

HEAD GOES AT THE TOP OVER THREE FULL LINES BUT IT IS VERY DIFFICULT TO FILL THIS AMOUNT OF SPACE WITH A HEADING AND THE RESULT IS UGLY ANYWAY

PICTURE

CAPTION

BODY TEXT 1

*FIG. 4*

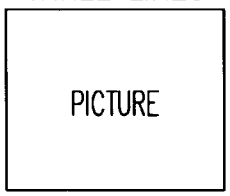
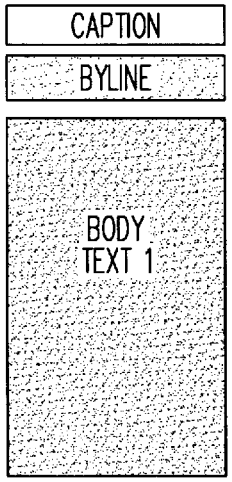
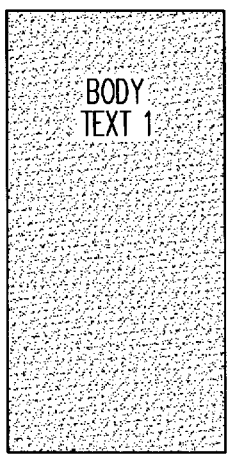
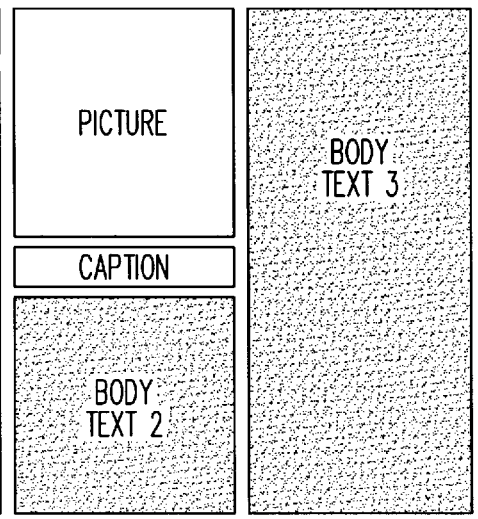
FIG. 5        FIG. 6

ELECTRONIC PUBLISHING SYSTEM

FIELD

The present invention relates to electronic and printed publishing and provides a mechanism by which text and images for publishing can be prepared and/or edited.

Particularly, but not exclusively, the present invention is directed at the layout of newsholes.

The present invention has application in electronic and printed media, for example newspapers, magazines and computer text systems.

BACKGROUND

The design of a newspaper provides a particular style and flavour discernible by the reader.

As used in this context, 'design' refers to the graphical rules or guidelines that govern how elements (such as headlines, pictures and text) should be used to construct newsholes, including the number and type of elements which may or may not be used in certain circumstances, the size and position of those elements in each case, direction on suitable typography, and usage of other graphic devices such as borders and colour.

The design style of a newspaper is often considered critical, for a number of reasons. For example, it has great bearing on the newspaper's "appeal" to different readers (such as, large heavy headlines in a tabloid, or smaller "dignified" headlines in a "quality" broadsheet). The readers are attracted to buy the paper and this obviously helps to determine that paper's market. Designs also serve the purpose of giving the newspaper a unique or distinct look so that they are distinguished from their competitors. For these reasons, very often newspapers spend considerable time, effort and money on determining their design "style".

Currently, in many publishing environments, the design of a newspaper is controlled by only a few people and is communicated—often verbally—from one person to another. These people may or may not also be responsible for laying out the newspaper (that is, implementing their own design) but, typically, layout is performed by people who did not determine the design style but who must learn it and implement it as faithfully as possible.

As a result, a number of problems and issues may and do arise with newspaper layout:

1. It is possible for the design to be implemented incorrectly in some cases, due to a misunderstanding or ignorance of its requirements, or pressure of workload, or lack of skill by the layout operator. This may result in a glaring and undesirable deviation from "style".
2. It is possible under the existing arrangements for the design and style of a newspaper to change over a period of time, due to changing interpretation of how it should be applied, and/or a build-up of a series of minor "styles" inaccuracies. Although this change may be subtle and may occur over a period of a number of years, any change is often noticed by readers of the newspaper, with possible negative effects on the readership of the newspaper.
3. A layout, although it may be creatively faithful to the design guidelines, may be inefficient in its usage of space, resulting in expensive wastage of space and/or less news being put in the paper.
4. Computer systems are available with electronic tools that facilitate the building of layouts. However, these systems will require the layout to be constructed manually using those tools, which is labour-intensive and time-consuming. In addition, these systems provide little or no guidance on the paper's style and do not assist the layout operator in determining how layouts should be designed. They merely permit the layout operator to build the layout, once the operator has personally determined what should be built.

U.S. Pat. No. 5,390,354 and GB 2,246,102 disclose how newsholes can be arranged to fill a given area (such as a page). However, they could not be used to generate the newsholes themselves.

U.S. Pat. Nos. 4,829,470, 5,287,443, 5,113,488, 4,755,955 and 5,079,724 all relate to different aspects of manipulating type and/or images to fit a given shape. These disclosures do not reach the concept of publication design rules, and they would not assist in any way in actually helping to build or determine the newshole design. These inventions address mechanical problems that may arise once it becomes necessary to pour text and/or images into those shapes to fill them up.

TERMINOLOGY

The publishing industry suffers from a lack of standard terms to describe common features of the trade: jargon varies widely not just from country to country, but even between publishing houses. To clarify the present disclosure, this brief glossary notes what we have used certain key terms to mean.

Page: This term is standard but may sometimes be confused with "newshole", described next. A page refers to the physical, printed page or some representation of it, such as a paper or electronic "dummy" page which is used for planning and preparing the printed version.

Design: Refers to the graphical rules or guidelines that govern how elements (such as headlines, pictures and text) should be used to construct newsholes, including the number and type of elements which may or may not be used in certain circumstances, the size and position of those elements in each case, direction on suitable typography, and usage of other graphic devices such as borders and colour.

Newshole: We have used this term to describe a component of a page, such as a story or advertisement (typically, we use it to mean "story" as in editorial reference, but conceptually, "advertisement" also fits). A newshole refers to a portion of a page, which portion has been used for a common purpose or means (such a presenting a story). A page may contain one or many newsholes which are usually discrete from each other. A newshole may itself be comprised of several elements: a story may contain headlines, pictures and text, which together make up the newshole for that story.

Layout: Refers to the way these design guidelines are implemented and actually put into practice in any particular instance.

Layout (or newshole) Element: This refers to the individual elements within a newshole, such as headlines, pictures, graphics, text, captions and so on.

Thus, pages contain newsholes, newsholes contain elements, and Design is the rules and Layout is the implementation of the design.

SUMMARY OF INVENTION

The present invention seeks to alleviate, at least, one problem associated with the prior art.

The present invention provides a system, apparatus and/or method of preparing or editing text for publishing in which:
  a newshole is filled in accordance with a design, and resizing of the newshole takes place if the fit is not in accordance with predetermined criteria.

Advantageously, if the newshole is resized, any number of the layout element(s) may also be resized.

In another form, the present invention enables the various elements of a newshole to be arranged (sized and positioned) and formatted (styles, using devices such as typography, colour and borders) in a manner that:
I. suits or matches the particular newshole design (presentation) rules of a publication, and or
II. allows the particular size and area of the newshole to be automatically fitted (or filled up) consistent with those design rules, by:
  A. allowing the user to predefine relationships between the various components of the newshole, which relationships determine each component's size and position relative to the others', and/or
  B. permits automatic recalculation of each component's size and position so that the newshole can be filled.

The present invention determines the shapes that comprise a newshole and/or what those shapes are (what they represent), and/or how big each one is, and/or where each is placed within the newshole.

For simplification purposes, the present invention is called NAILS, an acronym which stands for "Newspaper Automated Intelligent Layout System". (However, the present invention is not limited in application to newspapers, but can be used for any electronic or printed media where material is laid out or presented according to a certain style.) NAILS refers to the way the various elements of a newshole may be arranged (sized and positioned) and formatted (styled, using devices such as typography, colour and borders) in a manner that:
I. Suits or matches the particular design (presentation) of a publication and/or
II. Uses resizing to allow the particular size and area of the newshole to be automatically fitted (or filled up) consistent with those design rules.

NAILS achieves these aims by providing any number of the following facilities:
III. It allows the publication's design style to be defined by providing means whereby the publication can:
  A. Predefine suitable layouts and store these into a database and/or
  B. Determine and predefine the conditions or circumstances in which each of these layouts may be considered suitable for use and/or
  C. Define, for each of these layouts, rules governing the behaviour of each element of layout, as to its size, position and typographic style and so on. This facility allows the publication to predefine relationships between the various components of the newshole, which relationships determine each component's size and position relative to the others'.
IV. It facilitates the selection and usage of layouts (from a database) in accordance with the predefined design style. To achieve this, it:
  A. Allows the user of the database to specify the general type and style of the layout desired for the current newshole, in a quick, easy and intuitive manner and/or
  B. Determines which layouts are or are not suitable or correct for usage in the current newshole, in accordance with the predefined rules and taking into account the specified desires of the database user and/or
  C. Graphically displays for the user the correct or suitable layouts and allows selection of one of them and/or
  D. Prevents the user of the database from selecting unsuitable or incorrect layouts and/or
  E. Automatically builds the final layout, including transparently resizing the selected layout and its elements to suit the new size specified by the user, in accordance with the rules that have been defined for that layout and/or
  F. Automatically monitors any further edits that the user may make to the layout after it is drawn, and measures these against the predefined design rules. Depending on the nature and circumstances of those changes and the dictates of the predefined design rules, the present invention may further assist the user by: automatically adjusting the layout (or its elements) to accommodate or suit the user's manual edits; and/or suggesting that an entirely different layout would be more appropriate according to the predefined design style; and/or allowing the user to accept that suggestion, at which point the software may automatically build the new layout and/or use it to replace the previous one.

Figure 2:
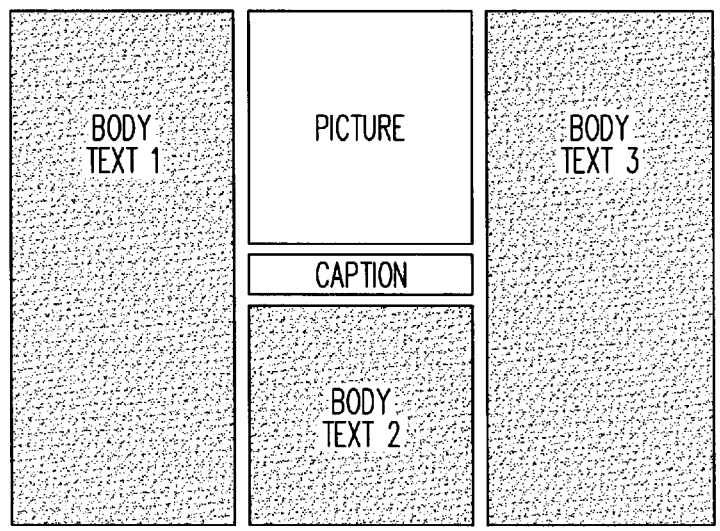
Figure 3:
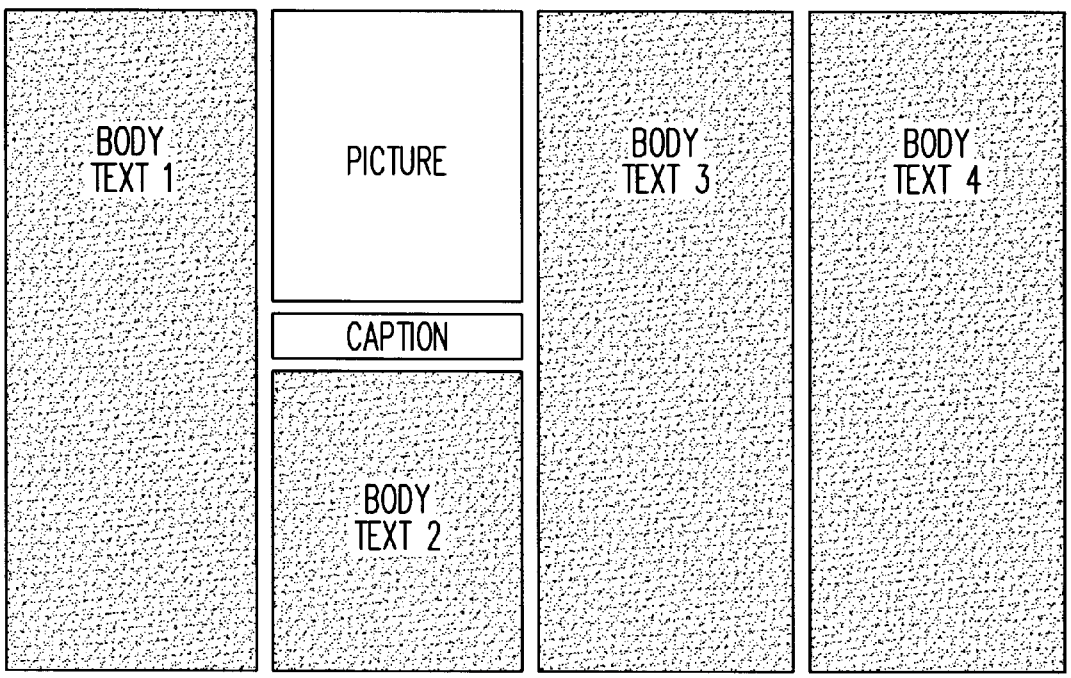

A preferred embodiment of the present invention will now be described with reference to the accompanying drawings, in which:

FIGS. 1, 2 and 3 illustrate examples of layout presentation
FIG. 4 illustrated a resized FIG. 1
FIGS. 5–7 illustrate FIGS. 1, 2 and 3 with by-lines added.

The NAILS system provides a separate "working area" for each publication published by a newspaper (such as separate daily and Sunday newspapers). The present invention utilises a database for each of those publications.

Within each publication, the database is programmed preferably in a hierarchical structure, which is:

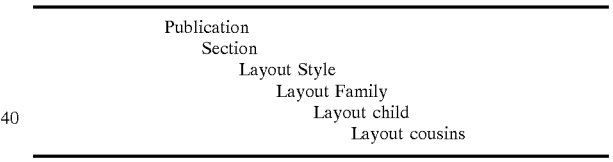

Section refers to the various sections of the publication, such as News, Sport, Business and so on. (The publication defines these according to its needs). Section was chosen as decisive division in the database because it is between different Sections that a newspaper's design style is most likely to vary. In other words, the design style (layout and typography) is likely to be more consistent within a Section but different Sections may have slightly different styles or design needs. The present invention facilitates this, although the newspaper may also decide that each Section will be the same.

Layout Styles exist within each Section and are defined by the publication. Each Section has its own set of Layout Styles, though these can be copied into multiple Sections if they have common usage. The number of Styles within a Section is not limited. Typically, Styles are set up to reflect generic layout uses, indicative of the Section's needs, for example: lead stories, picture stories, fillers, secondary leads and so on.

The Layout Families exist within each Layout Style and are defined by the publication. Each Family represents a layout variation or option within that Style: for example, a Style called "Picture stories" might contain options which feature both horizontally and vertically oriented pictures, and options such as placing the picture at certain positions within the story layout. There is no restriction on what these variations or options can be.

The Layout Children are contained with each Family and again are defined by the publication. Each child within a Family must have a unique size (width and depth) and the size of no two Children can overlap: within one Family, two or more Children may have the same width or depth, but no two can have the same width and depth. Typically, the Children in a Family will together form a contiguous range of sizes, so that the maximum limit of one Child will be defined by the minimum size of the next Child. Although the software will by default enforce this, it is preferred as it is not mandatory. The publication may specify a different maximum size (width or depth or both) for any Child (if only one dimension has a specified maximum, the software will use the default for the other dimension) so long as the resulting combination of width and depth is smaller than the next Child's minimum size.

The Layout Cousins represent "alternative Children". Although they are not part of the primary selection process, they are used to provide greater options to layout operators. Their use is described later. A Layout Cousin is related to a Layout Child: they both have the same size. A Layout Child may have more than one Cousin.

It should be pointed out that while many newspapers would be familiar with the concept of "Sections", the concepts of Layout Styles (as used here), Layout Families, Layout Children and Layout Cousins are unique to the present invention. To our knowledge, newspapers do not currently use such devices or concepts to organise their design style.

Description of populating the database

The present invention, in one form, provides tools for configuring, managing and populating the database. These tools are preferably but not essentially provided through menu bars and other computer functions within the application. They allow the publication to store/remove Sections, Styles, Families, Children and Cousins to/from the database.

The publication may draw (graphically) each Child in the base layout application being used with the present invention. Since one form of the present invention depends on the theory that layouts will always be selected and sized upwards (made larger than their original size, not smaller), the Child will be drawn at its smallest intended size.

The publication would then define, for each Child or Cousin, relationships between its various elements (such as headlines, pictures, captions, body text and so on). This is done using the Resizing Expressions noted below.

When a Child or Cousin is stored into the database, the publication nominates which Section/Style/Family it belongs to (and can create new Sections/Styles/Families as needed). The present invention then checks for any existing Children within that Family that may have a conflicting size range and automatically resolves that conflict by resetting the existing Child's maximum size (width, depth or both, as the case may be) to the minimum dimension/s of the new Child.

It is also expected that all the Children within a Family will exhibit what may be called "genetic consistency", in that they should all appear similar. That is, if one Child features a Picture above the main Heading, they all should. This is because a Family represents a particular variation or type of layout within a Layout Style; its Children then represent embodiments of that layout at various distinctive sizes.

For example, the configuration of the Headline may and usually will change as the layout's size increases: a small story of one column wide by 10 cm deep (4 inches) might feature two lines of headline at a pointsize of 14 pt with the only other element being one column of body text; but this headline configuration would not be used if the same layout were required to be used at six columns wide by 30 cm (12 inches) deep; instead, the publication might choose to use one line of headline at a pointsize of 42 pt and might also change the body text from one column to six separate columns. Although the specifics of the headline and body text are different in each case, the layout can still be said to be "genetically consistent" in that both represent the same approach of headline-over-body text. FIGS. 1–3 show how a certain style of layout presentation may be implemented differently at various sizes, according to the general sort of design rules that newspapers typically follow.

This illustrates the concept of Families and Children. It would be thoroughly confusing if, in the case described above, one Child contained a Subheading, Picture and Caption which were not present in other Children within the Family. Instead of implementing these entirely different layouts as different Children within the same Family, the concept underlying the present invention would suggest that the publication should set up two different Families, one featuring head-over-body, the other featuring the use of Headline, Subheading, Picture, Caption and Body.

Additionally, when Children are stored into the database, one Child within each Family will be identified as the "Head of Family", for purposes described later.

Description of Resizing Expressions

The Resizing Expressions allow relationships to be defined between the various elements of a layout (Child or Cousin), such as the headline, subheading pictures, captions, bylines, body text and so on.

These relationships are defined using a "dialog box" within the application (a small on-screen "window", opened via a menu bar or other command, that presents various options to the user).

The options available allow the publication to define, for any element, one of four different types of relationship:

A proportional relationship. In this case, the proportion is deduced from that which currently exists. For example, a picture may already occupy 60% of the depth of the total layout; specifying its depth to remain proportional would maintain the picture at 60% of the total layout depth, even if the layout is subsequently resized.

A fixed-difference relationship. In this case, the software measures the actual difference between two values, and maintains that. For example, a picture may be 5 cm (2 inches) shorter than the total layout; specifying its depth to remain a "fixed difference" from the layout's depth would maintain the picture at 5 cm less than the layout's depth, even if the layout is resized.

No relationship. The specified value does not change.

A specified expression or algorithm which the user enters. In this case, the user may enter a mathematical and/or logical expression, which will be used to calculate a new value when the layout is resized. For example, the user might specify a picture's depth to be 50% of the newshole depth, plus 2 cm.

Each of these expressions may be applied, completely independently, to an element's width, depth, horizontal position or vertical position. In each case (with the exception of the manually entered expressions), the specific values used for proportional or fixed-difference calculation are deduced from those values present in the layout as currently drawn.

In each case, the relationship may be specified as being relative to any other element in the layout, or to the dimensions of the layout itself. For example, the publication may define the vertical position of a picture (in a certain Child) as being a "fixed difference" relative to the position of a headline.

The width or depth of an element may be specified relative to any other element's (or the layout's) width or depth, using "proportional" or "fixed-difference" calculations, or using a specified expression, or none. A Maximum limit may also be placed on an element's width or depth, which will not be exceeded.

The horizontal or vertical position value of an element has additional options. First, the reference point of the position may be specified as being the element's top, middle or bottom point (for vertical positions) or its left, centre or right point (for horizontal positions). Secondly, this may be specified as being relative to the top/middle/bottom (or left/centre/right, as the case may be) position of the nominated reference element (or layout).

Thus, the vertical position of the picture (described above) would be specified not just as being relative to the position of the headline. It would additionally be defined as: the top, middle or bottom point of the picture is relative to the top, middle or bottom of the headline.

Using these Resizing Expressions, the inventors have found that virtually any desired relationship can be easily and quickly defined, and that as a result, virtually any resizing effect can be achieved.

As an example, a layout may contain a headline at the top (over three columns, say) with three individual columns of body text underneath. At the top of the second column of body text, but still underneath the headline, may sit a small picture (see FIG. 2).

Using these Resizing Expressions, it would be possible to specify that:

The headline will continue to stretch the full width of the layout (its vertical size and vertical and horizontal position do not need to change, but its width could be specified as either proportional to the layout's width, or a fixed-difference from the layout's width since in this case, both expressions would have the same result). Thus, if the layout was made wider, the headline would continue to stretch across its full width.

The first column of body text might be defined as: width, proportional to the width of the layout; depth, a fixed-difference from the layout's depth; h-position, none; v-position, top of body a fixed-difference from the bottom of the headline.

The second column of body text might be defined as: width, proportional to the width of the layout; depth, a fixed-difference from the layout's depth; h-position, left point is a fixed-difference from the right point of the first leg of the first leg of body text; v-position, top of body a fixed-difference from the bottom of the picture.

The third column of body text might be defined as: width, proportional to the width of the layout; depth, a fixed-difference from the layout's depth; h-position, left point is a fixed difference from the right point of the second leg of body text; v-position, top of body a fixed-difference from the bottom of the headline.

The picture might be defined as: width, proportional to the width of the second column of body text; depth, a fixed-difference from the layout's depth; h-position, left point is a fixed-difference from the left point of the second leg of body text; v-position, top of picture is a fixed-difference from the bottom of the headline.

In this case, as the layout was made wider, the headline would continue to stretch the full width of the layout; the individual columns of body text would continue to each occupy roughly one-third of the layout's width (we say roughly, because there is a space between each column of text, so each column is slightly less than 33% of the total layout width); the second and third columns of body text would move to the right, so that they continue to be correctly offset from the first column and from each other, evenly spaced across the width of the newshole; and the picture would continue to be the same width as the second column of body text, would continue to be positioned in line with that column, and would continue to sit under the headline and on top of the second column of body text.

We note also that, in the above example, that the width and the horizontal position of the picture could have been specified using different variations of the Resizing Expressions to achieve the same result.

Description of using the present invention to automatically build layouts

The layout editor uses the present invention, once the database has been set up containing layouts (Children) that have Resizing Expressions defined for them.

The present embodiment of the present invention permits different methods of usage. Only one is described here.

The layout editor may define, on the electronic version of the page to be laid out, an overall size for the particular story layout. The method for achieving this may vary depending on which application is being used as the base layout application (the present invention may work with many different layout applications), but typically this would involve graphically drawing a box to indicate the desired width and depth of the total layout. The specified size of the layout is known as the "target" size.

The layout editor may then invoke the present invention, as it is embodied in a computer application, using a menu bar or other computer command.

This will open a separate computer window. If the layout application system being used in conjunction with the present invention is able to tell the present invention which Section the current page belongs to, the present invention will by default select that Section. If not, or if the current Section's layouts are not actually desired, the user may select a Section manually.

With the desired Section specified, the user selects a Layout Style. The possibilities, as defined in the database, are listed in the present invention's window.

When this is done, the present invention reads the size of the target layout, notes the Section and the Layout Style requested, and searches for Families within the Section/Style which contain Children whose minimum size is smaller than or equal to the target's and whose maximum size is equal to or greater than the target's.

Because of the restriction that each Child within a Family must have a unique size (width/depth combination), only one Child can be selected from within each Family. It is possible that some Families may have no Children suitable for the target's size.

Once the possible Children are known, the present invention displays them within its window as a series of "thumbnails"—small, representative pictures of what each layout would look like.

At the same time, it resizes each Child to fit the target, using the Resizing Expressions defined for, and embedded within, each Child.

Thus, the layout editor is shown a number of layouts, each of which fits the target size, and each of which also suits the publication's particular design style for that Section (since the database is set up and subsequently searched in such a manner as to preclude "unsuitable" layouts being displayed).

To complete the operation, the layout editor simply selects the layout which appears most desirable. The present invention then "instructs" or "directs" the underlying layout application to build the selected layout according to the rules defined for it.

Thus, instead of having to build the layout manually in each case, the layout editor is simply able to work by selecting from a set of possibilities, and the computer is able to do all of the "leg work" required to actually build the layout.

This offers tremendous gains in the following areas: speed, faithful (consistent and accurate) implementation of design style, avoidance of design style errors, and simplicity of operation. It should be noted that the same series of actions are used to build any layout, regardless of its complexity, whereas when using manual layout applications, the amount of labour increases with the complexity of the layout.

Description of additional functions and points

The present invention provides a number of additional features, functions and methods of usage, including (but not limited to):

The invention is not limited or restricted to requiring a "target" layout size to be defined prior to requesting a selection of possible layouts. In this case, the procedure is the same except that a target is not specified, and the present invention does not search for a specific size of layout within the nominated Section/Layout Style. Instead, it retrieves those Children within the Families of the selection Section/Layout Style which have been marked as being "Head of Family". The layout editor may select one of these and it will be placed on the page at its default size. It can subsequently be resized.

If a layout, which has been selected and placed on the page, is resized so that either or both of its maximum dimensions are exceeded, the present invention monitors this and offers the layout editor a number of choices, one of which (the default) is to replace the Child with the Child which has been specified for use at the new size.

The present invention, may operate with any known layout application available commercially.

Furthermore, its database of stored layouts provides a convenient means of "translating" layouts between one application and another, so that a database of layouts designed for use with one layout application can easily be converted to work with any other layout application.

A function is provided whereby a particular Section/Layout Style/Family can be assigned (or "mapped") to a "hot-key", a key on a keyboard designated to carry out a particular computer command. This functions as a sort of computer "shorthand". It allows a certain style or type of layout to be assigned and then employed by a single command. In this case, it might not be necessary for the user to open the present invention's window and make any selections: the user could simply define a target and press the key assigned to a Section/Style/Family; the present invention would then automatically search that Family for the correct Child and fill in the layout effectively with a one-shot command (or, of no target was defined, it would place the"Head of Family" Child for that Section/Style/Family onto the page).

A function is provided whereby a user may select, on the page, a layout which was already created using the present invention, and then "cycle through" alternative layouts. In this case, the alternative layouts are selected from with the Section/Style as the current layout. Each of the alternative layouts is chosen form the other Families within that Section/Style. This presents a convenient means of revising or changing a layout which has already been drawn, in light of further developments concerning the page's overall design.

When the completed layout has been drawn into the target on the page, the layout is built as a series or set of objects which are in the "native" format used by the underlying application. That means the nature of the objects may vary depending on the needs of the underlying application, but that in any case, the objects will be editable within that application.

Figure 7:
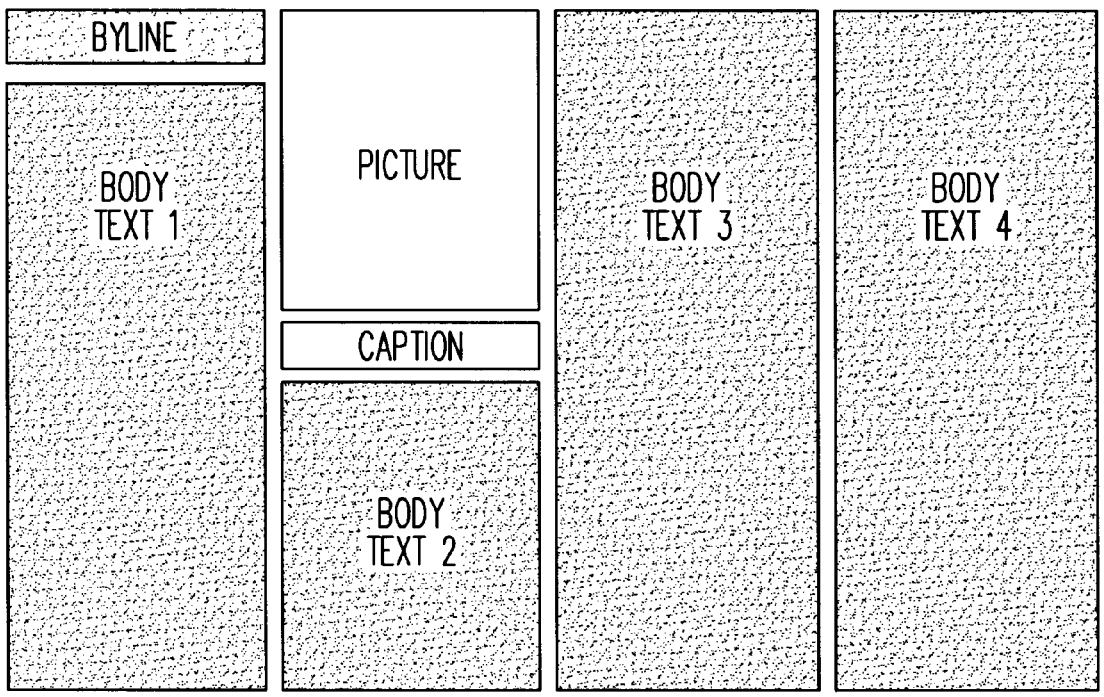

The Layout Cousins referred to throughout this document allow the layout editor to select variations on a particular Child, where the variation may not be substantial enough to warrant inclusion of the Cousin as a Child within its own right, in a separate Family. For example, the layouts in FIGS. 1–3 could conceivably also include Bylines for the reporter or contributing agency. Although some publications have a policy of always (or mostly) including Bylines, others allow the Bylines to be included or excluded according to certain criteria (even, sometimes, the whim of the layout editor). And even on those publications that do regularly include Bylines, there may need to be alternative Byline styles to accommodate, for example, the differences between a credit for a staff reporter and a credit for an agency reporter. In all of these cases, separate alternative Families could be set up to supply layouts with different Byline configurations (including no Bylines), but this would hardly seem worth the effort. It may also cause some confusion by presenting to the layout editor too many choices for selection, especially since the distinguishing features between the different Families would be so minor. In these cases, the publication would set up Layout Cousins which would mirror the layout in the primary Child, but would offer the different Byline configurations. The layout editor can then select the particular layout that is desired, but modify using it a simple command to include various Byline styles. The Byline could, of course, be added manually, but automating its inclusion again simplifies the operation and allows the publication to ensure that when it is included into the layout, it too follows the desired design style. FIGS. 5–7 illustrate the same layouts as FIGS. 1–3, but after Bylines have been added using Layout Cousins related (or assigned) to those Children. Another example of Layout Cousins might be to allow easy implementation of changes that do not affect the layout at all, only its typography. The layouts in FIGS. 1–3 all have bold-face headlines and, although it is not illustrated, might have roman-face body text. An alternative presentation could be roman-face headlines with bold-face text, and this too could be achieved neatly through the use of Layout Cousins.

In FIGS. 1, 2 and 3 it can be seen that the three layouts have different overall sizes and shapes and that the detailed particulars of each layout also vary to a certain extent:

The specific headline configuration is different in each layout, FIG. 1 has three lines of headline, FIGS. 2 and 3 each have two lines. Furthermore, the pointsize of each of the headlines is different in each layout.

Each layout contains a small picture and caption, but the specific position and relative position of this varies. In FIG. 1, its relative position is in column 1. In FIGS. 2 and 3 its relative position is column two, however, its specific position is different since the columns in FIG. 3 are wider than those in FIG. 2.

The number of body text columns varies between the layouts and the columns in FIG. 3 are wider.

However, it may also be seen from these illustrations that from a design perspective, the publication might actually consider all of these layouts to be variations of single style or type of layout. This is because the general "look and feel" of the layouts is consistent with each other; the only reason the specifics vary between them is because they are different sizes.

For example, if this layout were indeed required to be four columns wide, it would not usually be considered satisfactory simply to enlarge the layout in FIGS. 1 to fit, producing a layout that looks like FIG. 4.

Even if the layout were adjusted so that it had three columns of text, instead of one extremely wide column, it can be seen that headline configuration is all wrong. Instead, it would be understandable that the newspaper might prefer a layout similar to the one shown in FIG. 3. This is what the present invention allows.

Using conventional methods of drawing layouts manually (using a computer application), the layout editor would need to be familiar with this style as it is used by the publication, and would further need to understand how the style is to be implemented at these various size. Finally, the layout editor would need to build the desired layout manually, ensuring also that the style is adapted accurately to the particular size required. This would require the layout editor to manually draw each box for each element of the layout, to size and position each box correctly and then apply correct typographical styling to each box.

According to the present invention, these three layouts (and probably other, also similar layouts) would be stored as different Children within the same Family.

The layout editor would then define the target size (requiring the simple drawing of a single box on the page) and would invoke the present invention's window. If the default Section (for the current page) was suitable, and it nearly always will be, the layout editor would proceed by selecting a Layout Style, for example, "News stories with small pictures". (If the default Section, was not correct, the layout editor would select the correct one from a list).

The application would then display layouts appropriate to the size of the drawn target, one layout (Child) from each Family within the selected Layout Style (excepting any Families that do not have suitably sized Children). The layout editor would expect to see a series of graphical thumbnails each showing a layout. If the layouts in FIGS. 1–3 had been stored as Children in a Family within the "News stories with small pictures" style, and the target was of sufficient size, the layout in FIG. 3 would be shown in one of the thumbnails.

The layout editor would then simply select that layout and the present invention would instruct or direct the underlying application to draw the completed layout into the target on the page.

This would complete the layout operation. Notice, the layout was completed in only a few simple steps, that throughout the process the layout editor was guided as to what the suitable layouts might be, and that the final construction was fully automated.

EXAMPLE BENEFITS

1. Much faster to produce layouts. Initial tests on existing newspapers show the present invention would be useable for about 80% or more of newsholes, on average, and that in each of these, the use of the present invention would eliminate or alleviate between 70% and 95% of the existing manual work necessary with existing software programs. This provides newspapers with the potential to make significant productivity gains, in an area (layout) that currently requires a large number of specialist and highly-paid staff.

2. System training is a major overhead for newspapers. On average, we find that a layout editor requires two weeks of full-time computer training before they can start producing pages: most of this (7 out of 10 days) is devoted to learning how to produce typical layouts on the layout software. We estimate that with the present invention the average layout editor would be fully conversant, practised and able to start real work in under four hours, and that several days of additional training (which might not be required, in many cases) could then be carried out "on the job".

3. Layout training: A layout editor new to layout requires substantial training purely in terms of layout design ability. This time is typically measured in months, sometimes years. Even an experienced layout sub-editor, on joining a new and unfamiliar newspaper (or even a new section within his current newspaper), may have to spend weeks learning the "house style" before he can run without any "hand holding". Since the present invention "knows" the house style", can illustrate this (graphically) to the layout editor and manages and controls the implementation of that style, this time would virtually be eliminated.

4. When a newspaper embarks on a "re-design", this is costly and lengthy process where an entirely new design is invented and then brought into practice. The nature of this typically requires the change to be "all or nothing". There are extreme difficulties in re-training existing staff in preparation for this. The present invention removes the hassle since the design team can simply set up a new, alternative database. During the design stage, this also allows them to carry out considerable "real life" testing experimentation. Then, when it is ready for use, the newspaper simply switches (over night) to the new database. All that is required is a brief (under 1 hour) familiarisation briefing for the layout editors, or perhaps a short written overview of the changes.

5. Provides consistency of style and flavour of publication to readers.

6. In many cases, more efficient filling of newsholes.

I claim:

1. An electronic publishing system for preparation and/or editing of one or more publications via a computer, the system including a database which defines at least the following:

at least one publication to be prepared and/or edited, the publication having a plurality of sections, each of which includes at least one newshole;

at least one layout style for each section such that each layout style comprises a plurality of different layouts;

the layouts in each layout style forming one or more layout families, the layout families defining layout variations of publication elements such as text and images;

the one or more layout families structured so as to include layout children, wherein each layout child within a layout family is genetically consistent in format with all other children within the layout family and pertains to a different size newshole from all other children within the layout family.

2. The system of claim 1 wherein said database further includes layout cousins which define alternative layout children.

3. The system of claim 1, wherein each layout style is associated with a plurality of sections.

4. The system as claimed in claim 1 wherein the relationship defined by the resizing means includes one of:
   a) proportional relationship;
   b) fixed-difference relationship; or
   c) a user-defined specific expression or algorithm relationship.

5. A method of preparing and/or editing a page of a publication using the system of claim 1, comprising the following steps:
   defining a section to which the page is to belong;
   defining a layout style within the section defined to which the page is to conform;
   searching the database of layout families within the defined section and layout style for appropriate layout children;
   displaying the appropriate layout child or children;
   selecting one of the displayed layout children to be used as the format for the page; and
   resizing the child to fit it to a newshole on the page.

6. An electronic publishing system for preparation and/or editing of one or more publications via a computer, the system including a database storing a plurality of layouts according to the following structure:
   the plurality of layouts are associated with at least one publication to be prepared and/or edited;
   the one publication is divided into a plurality of sections each containing at least one newshole, with each section being associated with at least one layout style;
   each layout style comprises a plurality of layouts;
   the layouts in each layout style are arranged into layout families wherein the layout families define variations of publication elements;
   the layout families are structured to include layout children, wherein each layout child within a layout family is genetically consistent in format with all other children within the layout family; and
   resizing means for defining a geometric relationship between the publication elements of each layout child to fit within a designated newshole.

7. The system of claim 6 wherein said database includes layout cousins which define alternative layout children.

8. A method of preparing and/or editing one or more publications via an electronic publishing system in a computer, the method including the steps of:
   defining a plurality of sections for one or more publications;
   defining at least one layout style for each section wherein each layout style is made up of a plurality of different layouts;
   arranging the different layouts in each layout style into one or more layout families, such that the layout families define layout variations of publication elements such as text or images;
   defining layout children for the layout families, wherein each layout child within a layout family is genetically consistent in format with all other children within the layout family, and pertains to a different size newshole from all other children within the layout family;
   designating a newshole in a section to be prepared;
   designating a layout style to which the section to be prepared is to conform;
   searching the layout families within the designated section and layout style for appropriate layout children which correspond to the designated newshole;
   displaying the appropriate layout child or children; and
   selecting one of the displayed layout children to be used as the format for the page.

9. The method of claim 8 further including the step of:
   defining an overall size of a page belonging to the designated section, so that the appropriate layout children are those which substantially correspond to the defined size of the page.

10. The method of claim 9 wherein layout families are only searched if they contain children whose minimum size is smaller than or equal to the defined size and whose maximum size is equal to or greater than the defined size.

11. The method claim 10 further including the step of:
    resizing the layout elements of the appropriate layout child or children located, according to defined geometric relationships between the layout elements, before displaying the appropriate layout child or children.

12. The method of claim 9 further including the steps of:
    monitoring any changes made by a user to the selected layout;
    determining whether the changes result in a layout which exceeds at least one maximum dimension of the selected layout; and
    if at least one of the maximum dimensions are exceeded, suggesting an alternative layout.

13. The method of claim 8 wherein one child in each family is marked as Head of the Family, and only the children so marked are searched for conformity to the designated section and layout style.

14. A method for preparing a publication, comprising the steps of:
    storing in a database a plurality of layout families, each representing a different format for elements of a newshole, each layout family including a plurality of layout children which pertain to newsholes of respectively different sizes;
    displaying one child for at least some of said plurality of layout families;
    designating one of the displayed layout children;
    resizing the designated layout child to fit a specified newshole size;
    determining whether the resized layout child exceeds limits of the newshole size to which it corresponds;
    replacing the designated layout child with a different layout child from the same layout family whose associated size corresponds to the specified newshole size, if said limits are determined to have been exceeded; and
    generating a newshole in accordance with the designated layout child or replacement layout child, as appropriate.

15. The method of claim 14 wherein the children within a family respectively pertain to mutually exclusive ranges of sizes in at least one geometric dimension.

16. The method of claim 14 further including the steps of storing resizing expressions that are respectively associated with said layout children and which specify geometric relationships between elements of a newshole for an associated layout child, and wherein said resizing step is carried out in accordance with said stored expressions.

* * * * *